United States Patent [19]
Bailey

[11] Patent Number: 6,003,315
[45] Date of Patent: Dec. 21, 1999

[54] EXHAUST GAS RECIRCULATION SYSTEM FOR AN INTERNAL COMBUSTION ENGINE

[75] Inventor: Brett M. Bailey, Peoria, Ill.

[73] Assignee: Caterpillar Inc., Peoria, Ill.

[21] Appl. No.: 08/828,240

[22] Filed: Mar. 31, 1997

[51] Int. Cl.[6] .................................................. F02M 25/07
[52] U.S. Cl. ............................................................ 60/605.2
[58] Field of Search ........................ 60/605.2; 123/568.62

[56] References Cited

U.S. PATENT DOCUMENTS

| | | |
|---|---|---|
| 4,142,493 | 3/1979 | Schira et al. . |
| 4,161,929 | 7/1979 | Nohira et al. . |
| 4,164,032 | 8/1979 | Nohira et al. . |
| 4,164,206 | 8/1979 | Toelle . |
| 4,173,203 | 11/1979 | Nakajima et al. . |
| 4,177,777 | 12/1979 | Maruyama et al. . |
| 4,249,382 | 2/1981 | Evans et al. . |
| 4,250,706 | 2/1981 | Mitsuda et al. . |
| 4,267,812 | 5/1981 | Aula et al. . |
| 4,291,760 | 9/1981 | Argvle et al. . |
| 4,350,013 | 9/1982 | Yoshiba . |
| 4,354,476 | 10/1982 | Straubel . |
| 4,356,806 | 11/1982 | Freesh . |
| 4,426,848 | 1/1984 | Stachowicz ............................ 60/605.2 |
| 4,445,488 | 5/1984 | Tanaka et al. . |
| 4,474,008 | 10/1984 | Sakurai et al. . |
| 4,594,993 | 6/1986 | Engel et al. . |
| 4,727,848 | 3/1988 | Stumpp et al. . |
| 5,121,734 | 6/1992 | Grieshaber et al. . |
| 5,333,456 | 8/1994 | Bollinger ............................... 60/605.2 |
| 5,440,880 | 8/1995 | Ceynow et al. ........................ 60/605.2 |
| 5,611,203 | 3/1997 | Henderson et al. .................... 60/605.2 |
| 5,740,786 | 4/1998 | Gartner .................................. 60/605.2 |
| 5,802,846 | 9/1998 | Bailey .................................... 60/605.2 |

FOREIGN PATENT DOCUMENTS

| | | |
|---|---|---|
| 43 19 380 | 12/1993 | Germany . |
| 42 40 239 | 6/1994 | Germany . |
| 43 31 509 | 7/1994 | Germany . |
| 44 22 966 | 5/1995 | Germany . |
| 64-345 | 1/1989 | Japan .................................... 60/605.2 |

*Primary Examiner*—Michael Koczo
*Attorney, Agent, or Firm*—Robert J. Hampsch

[57] ABSTRACT

An exhaust gas recirculation (EGR) system for a turbocharged internal combustion engine is provided. The EGR system includes a recirculation conduit for recirculating a volume of exhaust gas from the exhaust manifold to the intake manifold; a bypass conduit for diverting a flow of intake air around the engine; and an EGR cooler disposed in operative association with the recirculation conduit and the bypass conduit and adapted for cooling the volume of recirculated exhaust gas in the recirculation conduit. The exhaust gas recirculation cooler or heat exchanger is also adapted for concurrently heating the intake air in the bypass conduit. The heated intake air together with the exhaust gas remaining in the exhaust manifold is used to drive the turbocharger. The disclosed embodiment of the exhaust gas recirculation system also includes an air-to-air after-cooler used to cool the compressed intake air. The cool, compressed air is then diverted to the exhaust gas recirculation cooler to cool the recirculated exhaust gas.

16 Claims, 3 Drawing Sheets

EXHAUST GAS RECIRCULATION SYSTEM FOR AN INTERNAL COMBUSTION ENGINE

FIELD OF THE INVENTION

The present invention relates to an exhaust gas recirculation (EGR) system for an internal combustion engine, and more particularly, to an exhaust gas recirculation cooler for use in a turbocharged diesel engine that is adapted for cooling the EGR flow and concurrently recouping some of the heat and mass flow diverted from the exhaust gas driven turbine by the EGR system.

BACKGROUND

Exhaust gas recirculation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas recirculation technique primarily involves the recirculation of exhaust gas by-products into the intake air supply of the internal combustion engine. This exhaust gas thus reintroduced to the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

Another technique useful in the control and reduction of undesirable emissions from internal combustion engines is the use of pressure-charged intake air. This permits the use of relatively smaller cubic displacement and lighter weight internal combustion engines in mobile equipment, reducing in turn the specific fuel consumption of the vehicle and overall mass of the vehicle necessary to perform a given function. In addition to the benefits of reduced size and mass, the typical pressure-charging device may be controlled to provide improved emissions characteristics. Pressure-charging machines suitable for such applications include the exhaust gas driven turbocharger which is comprised typically of an exhaust gas driven turbine linked to a turbine disposed in the intake air stream to provide compression of the intake air. The typical turbocharger is controlled by providing a gate which controls exhaust gas flow and gates exhaust gas to bypass the exhaust gas turbine and control the charging rate of the turbocharger so that the maximum pressure limits of the associated internal combustion engine are not exceeded.

Still another technique for controlling emissions used by many engine manufactures is the use of aftercooling the intake air thereby reducing the intake manifold temperature. Some of the related art techniques have also considered intercooling the EGR gases by routing the recirculated exhaust gases through an aftercooler. It is well known that lower intake manifold temperatures tends to reduce the formation of nitrous oxides found in the exhaust.

When utilizing EGR in a turbocharged diesel engine, the exhaust gas to be recirculated is preferably removed upstream of the exhaust gas driven turbine associated with the turbocharger. In many EGR applications, the exhaust gas is diverted directly from the exhaust manifold. Likewise, the recirculated exhaust gas is preferably re-introduced to the intake air stream downstream of the compressor and air-to-air aftercooler. For example, in many EGR applications the recirculated exhaust gas is reintroduced to the intake manifold.

Reintroducing the exhaust gas downstream of the compressor and air-to-air aftercooler is preferred due to the reliability and maintainability concerns that arise should the exhaust gas is passed through the compressor and aftercooler. However at some engine operating conditions, there is a pressure differential between the intake manifold and the exhaust manifold which essentially prevents many conventional EGR systems from being utilized. For example, at high speed, high load conditions in a turbocharged engine, the exhaust gas does not readily flow from the exhaust manifold to the intake manifold. What is needed, therefore, is a simple and inexpensive technique for recirculating exhaust gas from the exhaust manifold to the intake manifold at all engine operating conditions.

Another problem associated with many conventional EGR systems is that the turbocharger efficiency is sacrificed when exhaust gas is diverted from the exhaust manifold. Removing the exhaust gas to be recirculated from the exhaust manifold or elsewhere upstream of the exhaust gas driven turbine depletes the mass flow and heat energy passing through the turbine which, in turn, lowers the boost levels created by the compressor. Most diesel engine turbochargers are fixed geometry turbochargers, in that they are specifically designed to operate efficiently when matched to the engine exhaust flow output. The reduction in mass flow and pressure due to the EGR creates a mismatch between the exhaust flow to the turbocharger and the turbine specifications during EGR operation. The mismatch results in a turbocharger output that is reduced in percentage more than the percentage reduction in exhaust flow to the turbocharger thereby creating significant losses in airflow and boost pressure. The reduction in airflow and boost pressure decreases the air to fuel ratio down to a point where particulates as well as the brake specific fuel consumption (BSFC) increase. Disadvantageously, the reduction in airflow and boost pressure also results in a noticeable difference in engine performance to the operator depending on whether EGR is on or off.

SUMMARY OF THE INVENTION

The present invention addresses the above and other needs by providing a method and system for exhaust gas recirculation in an internal combustion engine, preferably a turbocharged diesel engine.

In one aspect, the invention may be characterized as an exhaust gas recirculation (EGR) system incorporating: a recirculation conduit for recirculating a volume of exhaust gas from the exhaust manifold to the intake manifold; a bypass conduit for diverting a flow of intake air around the engine; and an EGR cooler disposed in operative association with the recirculation conduit and the bypass conduit and adapted for cooling the volume of recirculated exhaust gas in the recirculation conduit. The exhaust gas recirculation cooler is also adapted for concurrently heating the intake air in the bypass conduit. The heated intake air is preferably used to replace the diverted exhaust gas. In other words, the heated intake air together with the exhaust gas remaining in the exhaust manifold are used to drive the turbine and associated compressor to pressurize the intake air.

The disclosed embodiment of the exhaust gas recirculation system also includes an air-to-air after-cooler interposed between the compressor and the intake manifold to cool the compressed intake air. The bypass conduit diverts a portion of the cool, compressed intake air to the exhaust gas recirculation cooler or heat exchanger to cool the recirculated exhaust gas.

The invention may also be characterized as a method for recirculating exhaust gas in a turbocharged internal combustion engine. The disclosed method comprises the steps of: (a) recirculating a selected volume of exhaust gas from the exhaust manifold to the intake manifold via a recirculation conduit; (b) diverting a flow of cool intake air to bypass the engine via a bypass conduit; and (c) cooling the recirculated exhaust gas in the recirculation conduit using the flow of diverted intake air. The disclosed method of recirculating exhaust gas further includes the step of heating the intake air in the bypass conduit using the recirculated exhaust gas. The step of heating the intake air in the bypass conduit and the step of cooling the recirculated exhaust gas in the recirculation conduit are preferably accomplished concurrently. The heated intake air along with any remaining exhaust gas in the exhaust manifold is then directed to the gas driven turbine of the turbocharger. In this manner, the losses in the turbocharger speed due to the exhaust gas recirculation are minimized.

Accordingly, an important aspect of the disclosed invention is the use of intake air to cool the recirculating exhaust gases. This eliminates the need to use the engine coolant to absorb the heat rejection from the recirculating exhaust gases. In addition, the use of intake air to cool the recirculating exhaust gases thus avoids or minimizes pumping losses incurred in many related art systems where jacket water flows through the EGR cooler.

Advantageously, by cooling the EGR gases to temperatures slightly above the temperature of the after-cooled intake air, the intake manifold temperatures are lowered and the air to fuel ratio for a given volume of EGR can be increased. Lowering the intake manifold temperatures and increasing the air to fuel ratio for a given volume of EGR results in improved emissions performance.

Another important aspect of the disclosed invention is the use of the recirculated exhaust gases to heat the diverted intake air. This heated intake air is routed to the turbocharger along with the non-recirculated exhaust gases present in the exhaust manifold. Directing both the heated intake air and non-recirculated exhaust gases to the turbocharger allows the standard, fixed geometry turbochargers to operate at a more efficient temperature, pressure and air mass flow. The more efficient operation of the turbocharger during EGR operations allows for the improvement of the air to fuel ratio at high engine loads and permits the use of EGR at engine operating conditions that many related art EGR systems have avoided.

Advantageously, the present EGR system facilitates the use of EGR at high engine loads and allows for rapid transient response of a turbocharger. In other words, the turbocharger speed will remain high during EGR operation thus allowing quick response time when switching from EGR operation to non-EGR operation.

BRIEF DESCRIPTION OF THE DRAWINGS

The above and other aspects, features, and advantages of the present invention will be more apparent from the following, more descriptive description thereof, presented in conjunction with the following drawings, wherein.

Corresponding reference numbers indicate corresponding components throughout the several embodiments depicted in the drawings.

DETAILED DESCRIPTION OF THE INVENTION

The following description is of the best mode presently contemplated for carrying out the invention. This description is not to be taken in a limiting sense, but is made merely for the purpose of describing the general principals of the invention. The scope and breadth of the invention should be determined with reference to the claims.

Figure 1:
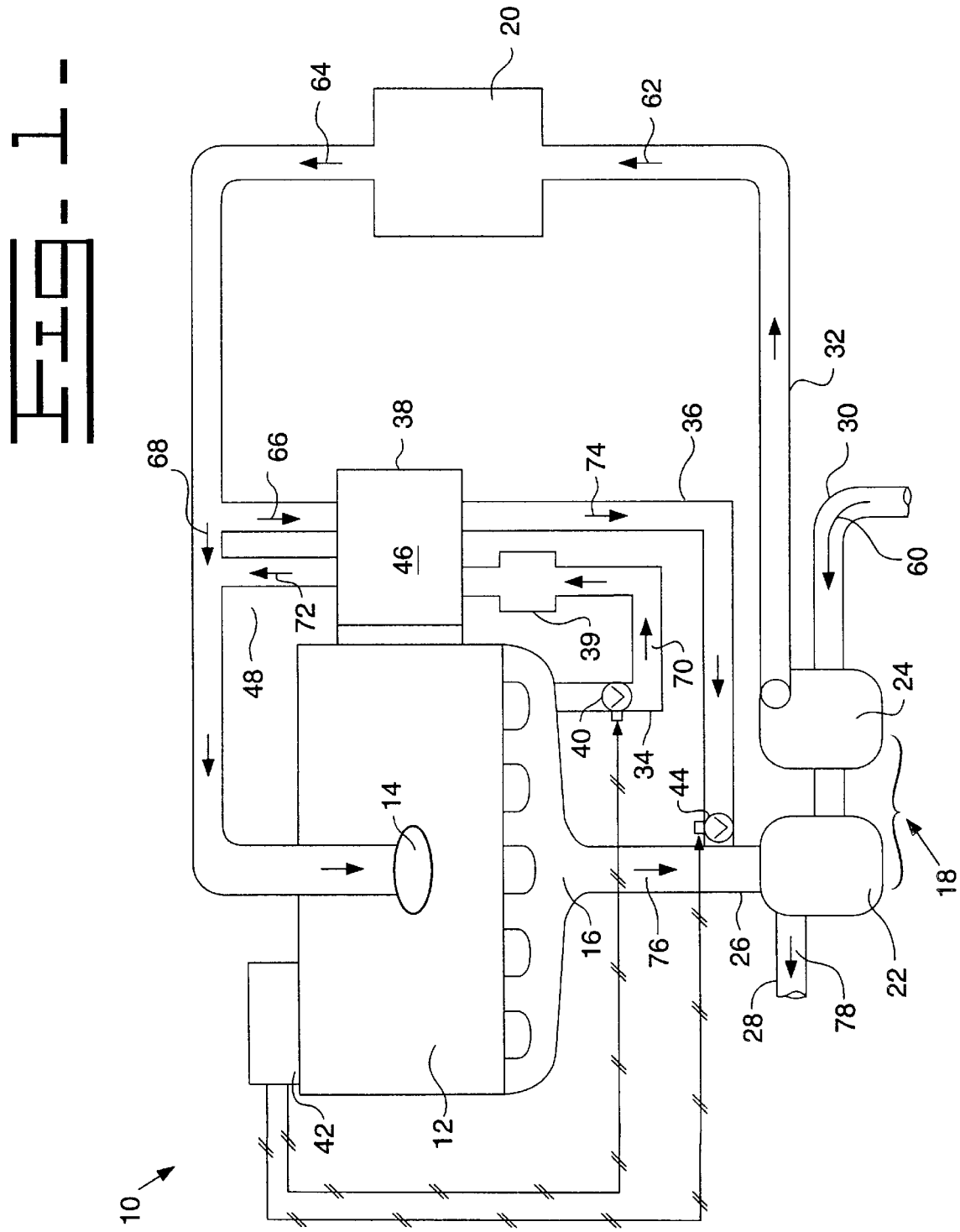
FIG. 1 is a schematic representation of the exhaust gas recirculation (EGR) system for a turbocharged engine in accordance with the present invention.

Turning now to the drawings and particularly to FIG. 1 there is shown a schematic representation of the exhaust gas recirculation (EGR) system 10 for a turbocharged compression ignition engine 12 (i.e. diesel engine). As seen therein, the turbocharged compression ignition engine 12 includes an intake manifold 14, exhaust manifold 16, a turbocharger 18, and an air-to-air aftercooler 20. The turbocharger 18 is preferably a fixed geometry turbocharger having an exhaust gas driven turbine 22 coupled to an intake air compressor 24. The turbocharger 18 also includes an exhaust gas inlet 26 and an exhaust gas outlet 28 both in fluid communication with the exhaust gas driven turbine 22. The turbocharger 18 further includes a fresh intake air conduit 30 and a compressed air exit conduit 32 both of which are in fluid communication with the air compressor 24.

In the preferred embodiment, the EGR system 10 includes an EGR conduit 34, an intake air bypass conduit 36, an EGR cooler 38 or heat exchanger, and an optional particulate trap 39. As seen in FIG. 1, the EGR conduit 34 is disposed in fluid communication with the exhaust manifold 16 and is adapted for diverting a flow of exhaust gas from the exhaust manifold 16 to a position downstream of the turbocharger 18 and air-to-air aftercooler 20 and proximate the intake manifold 14. The diverted flow of exhaust gas from the exhaust manifold 16 via the EGR conduit 34 is controlled using one or more EGR valves 40 operatively associated with an engine controller 42 or similar such engine control module.

The illustrated EGR system 10 also includes the intake air bypass conduit 36 for diverting a flow of cooled, compressed intake air from a position downstream of the turbocharger 18 and air-to-air aftercooler 20 to the exhaust manifold 16. The diverted flow of cooled, compressed intake air within the bypass conduit 36 is likewise controlled using a bleed air valve 44 operating under the control of the engine controller 42.

In the illustrated embodiment, the EGR cooler 38 is a counterflow air to EGR heat exchanger. The illustrated EGR cooler 38 is adapted to receive a hot EGR input flow from the exhaust manifold 16 via the EGR conduit 34 and yield a cooled EGR output flow. The counterflow of the EGR cooler 38 is adapted to receive the diverted intake air or bleed air via bypass conduit 36. The cooled and compressed intake air is then heated by the hot EGR to produce heated intake air while simultaneously cooling the EGR flow through the EGR cooler 38. The heated intake air exiting from the EGR cooler 38 is combined with the exhaust gas remaining in the exhaust manifold 16 and used to drive the exhaust gas driven turbine 22 and associated compressor 24 thereby pressurizing the intake air approximate to the designed boost levels. As indicated above, the use of intake air to cool the EGR eliminates the need to use the engine coolant to absorb the heat from the recirculating exhaust gases and avoids pumping losses associated therewith.

Additional features of the illustrated embodiment of the EGR system include an exhaust particulate trap 39. The particulate trap 39, if used, is preferably disposed along the EGR conduit 34 upstream of the EGR cooler 38. Similarly, a regenerator device, generally known to those skilled in the art, could be used in lieu of the counterflow air to EGR heat exchanger to accomplish the transfer of heat from the recirculating exhaust gases to the cool, compressed intake air thereby cooling the EGR flow while concurrently heating the bypass air flow to recuperate some of the diverted exhaust flow used to drive the turbocharger.

In the embodiment illustrated in FIG. 1, the diverted exhaust gas is driven to the intake manifold 14 by the positive displacement pumping action of one or more designated cylinders. The complete diversion of exhaust gas from one or more cylinders to the EGR conduit 34 allows the EGR rate to be kept more or less constant without having to throttle the EGR valves 40. In addition, since the exhaust gas diverted from the selected cylinders is typically pressurized above that of the exhaust manifold 16 and intake manifold 14, the EGR system 10 is adapted to operate within a broader range of engine operating conditions (i.e. at high load conditions) and generally maintains the EGR cooler free of significant particle build up. As indicated above, there exist some engine operating conditions, such as high load conditions, where the pressure differential between the intake manifold and the exhaust manifold essentially prevents many conventional EGR systems from being utilized without expensive and inefficient throttling arrangements in either the exhaust or intake manifolds. Likewise, the use of heat exchangers in many conventional EGR systems is avoided due to the problems associated with soot and particle build up over time. The illustrated embodiment minimizes such problems.

Figure 2:
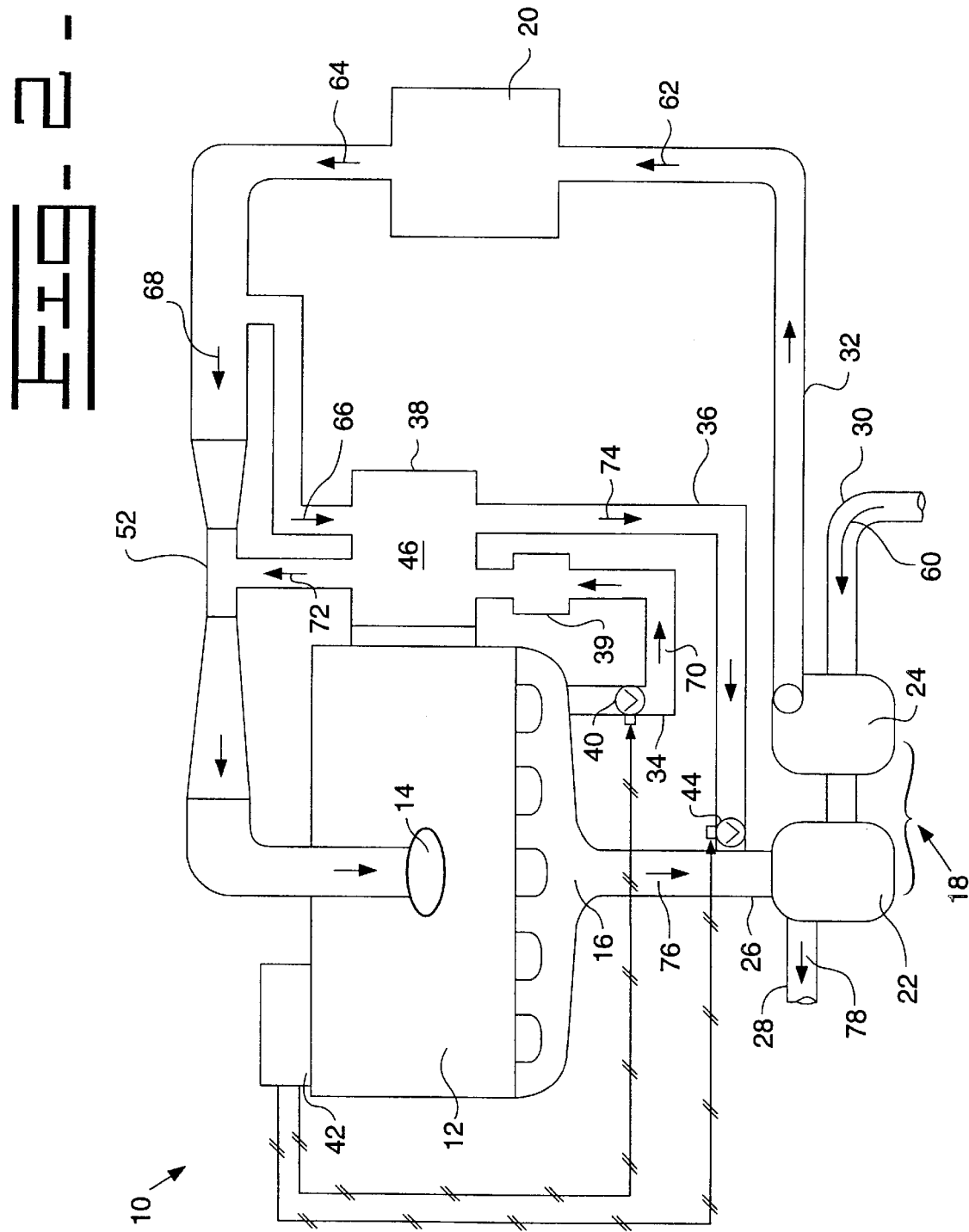
FIG. 2 is a schematic representation of an alternate embodiment of the exhaust gas recirculation (EGR) system for a turbocharged engine in accordance with the present invention.

Turning now to FIG. 2, there is shown an alternate embodiment of the EGR system 10. In most respects, the EGR system 10 of FIG. 2 is similar to that disclosed above, with reference to FIG. 1, except for the technique and associated structure for driving the diverted exhaust gas from the exhaust manifold 16 to the intake manifold 14. In the embodiment illustrated in FIG. 2, the intake air circuit includes a venturi throat 52 disposed downstream of the air-to-air aftercooler 20 and turbocharger 18 and upstream of the intake manifold 14. The EGR conduit 34 diverts the exhaust gas from the exhaust manifold 16 to a location proximate the throat of the venturi throat 52 thereby allowing the lower pressure exhaust gas from the exhaust manifold 16 to be drawn into the intake circuit and fed into the engine 12 with the intake air. Again, since the exhaust gas diverted from the exhaust manifold 16 is typically pressurized below that of the intake manifold 14 in many engine operating conditions, the venturi throat 52 is adapted to compensate for the pressure differences and allow the EGR system 10 to operate within the a broader range of engine operating conditions (i.e. at high load conditions).

Turning again to FIG. 1, one skilled in the art can appreciate and understand the preferred method of recirculating exhaust gas associated with the illustrated embodiment. Broadly speaking, the disclosed method of recirculating exhaust gas comprises the steps of: recirculating a selected volume of exhaust gas from the exhaust manifold 16 to the intake manifold 14 via the EGR conduit 34; diverting a flow of cool intake air to bypass the engine 12 via a bypass conduit 36; and cooling the recirculated exhaust gas in the EGR conduit 34 using the flow of diverted intake air and an EGR to intake air heat exchanger 46. The method also includes the step of concurrently heating the intake air in the bypass conduit 36 using the recirculated exhaust gas. The heated intake air is fed to the exhaust manifold 16 where it is used to replace the recirculated exhaust gas. The heated intake air is combined with the remaining exhaust gas and used to drive the turbine 22 of the turbocharger 18.

Figure 3:
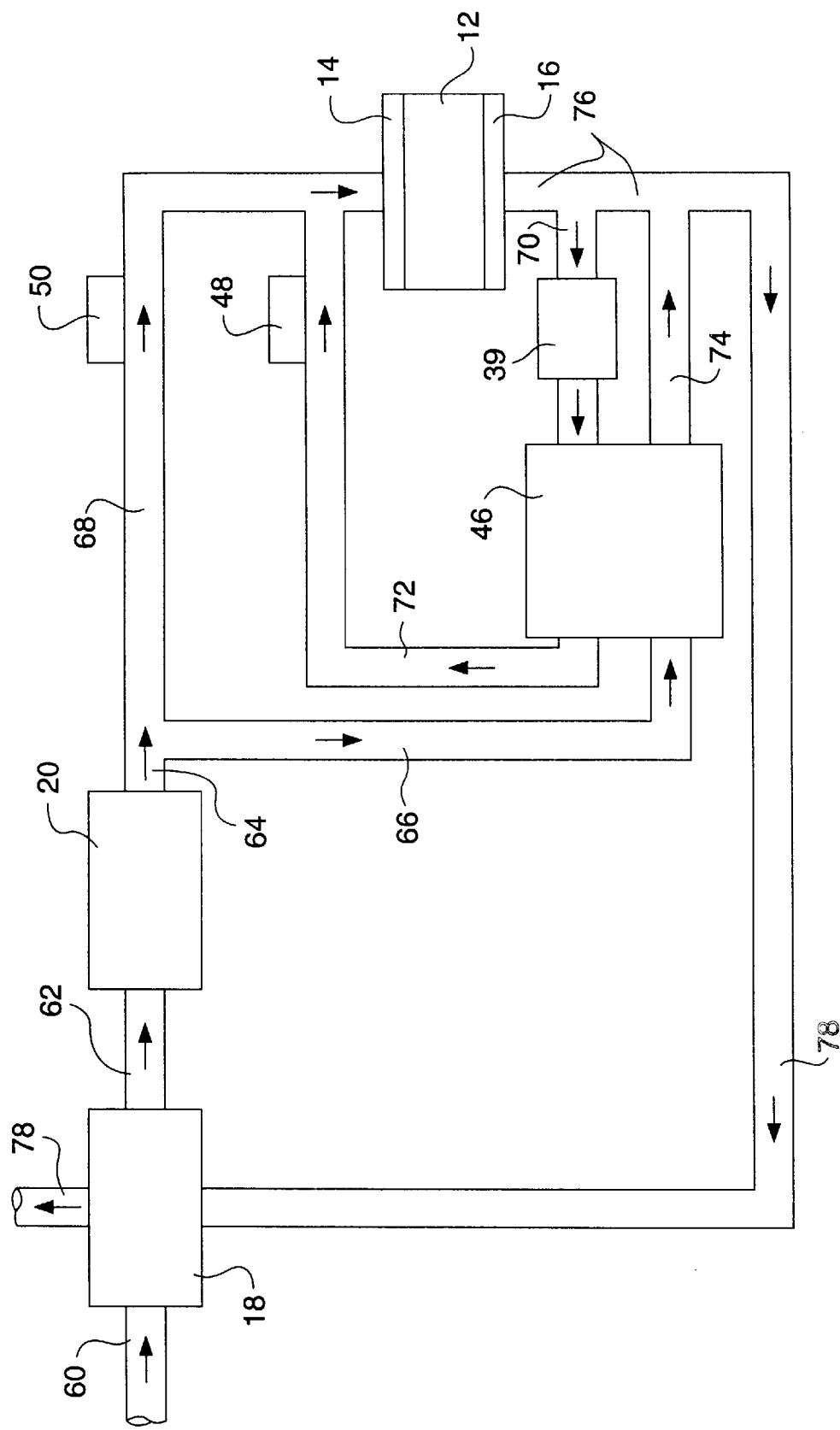
FIG. 3 is a functional block diagram of the exhaust gas recirculation (EGR) system of FIG. 1, generally depicting a detailed method for recirculating exhaust gas in a turbocharged diesel engine in accordance with the present invention.

Turning now to FIG. 3, there is shown a functional block diagram generally depicting a more detailed method for recirculating exhaust gas in a turbocharged diesel engine. It is important to note that while the description hereof is present in a sequential nature, many of the actual functions involved in the preferred process are performed concurrently, and not all steps are essential to the present method.

With the foregoing in mind, the depicted method involves the steps of: (a) receiving fresh intake air 60 at the turbocharger 18; (b) compressing the fresh intake air 60 with turbocharger 18; (c) sending the compressed intake air 62 to the air-to-air aftercooler 20; (d) cooling the compressed intake air 62 using the air-to-air aftercooler 20 to yield cooled compressed intake air 64; (e) diverting a selected volume 66 of the cooled compressed intake air 64; and (f) forwarding the remaining cooled compressed intake air 68 to the engine 12.

The preferred method also includes the steps of (g) diverting a selected volume of hot exhaust gas 70 from the exhaust manifold 16 of the engine 12; (h) cleansing the diverted hot exhaust gas 70 using a particulate trap 39; (i) cooling the diverted hot exhaust gas 70 to yield cooled exhaust gas 72 while concurrently heating the diverted volume of intake air 66 to yield heated intake air 74 using the heat exchanger 46; (j) combining the cooled exhaust gas 72 with the cooled compressed engine intake air 68 proximate the intake manifold 14; and (k) forwarding the combined intake/EGR gas to the engine 12. Concurrently therewith the preferred method also includes: (1) replacing the hot exhaust gas 70 diverted from the exhaust manifold 16 with the heated intake air 74 and combining the heated intake air 74 with any remaining exhaust gas 76 to form a selected volume of discharge air 78; (m) driving an exhaust gas driven turbine 22 of the turbocharger 18 with the discharge air 78; and (n) forwarding the discharge air 78 to the exhaust system associated with the engine.

From the foregoing, it should be appreciated that the present invention thus provides a method and system for the recirculation of exhaust gas in a turbocharged diesel engine. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. An exhaust gas recirculation system in an internal combustion engine having an intake circuit, an intake manifold and an exhaust manifold, said intake circuit including an intake air pressurizing device, said exhaust gas recirculation system comprising:

an exhaust gas recirculation conduit for diverting a flow of exhaust gas to said intake manifold;

an intake air bypass conduit in fluid communication with said intake circuit for permitting a flow of intake air from said intake circuit; and an exhaust gas recirculation cooler disposed in operative association with said exhaust gas recirculation conduit and said intake air bypass conduit and adapted for cooling said exhaust gas in said exhaust gas recirculation conduit.

2. The exhaust gas recirculation system of claim 1 wherein said exhaust gas recirculation cooler is further adapted for heating said intake air in said intake air bypass conduit.

3. The exhaust gas recirculation system of claim 2 wherein said air intake pressurizing device includes a compressor and a gas driven turbine, said gas driven turbine adapted to receive exhaust gas from said exhaust manifold together with said heated intake air from said air intake bypass conduit and drive said compressor thereby pressurizing said intake air in said intake circuit.

4. The exhaust gas recirculation system of claim 3 wherein said intake circuit further includes an air-to-air after-cooler interposed between said intake manifold and said compressor and in fluid communication therewith to cool said compressed intake air.

5. The exhaust gas recirculation system of claim 4 wherein said intake air bypass conduit is disposed in fluid communication with said intake circuit at a location downstream of said air-to-air aftercooler, said intake air bypass conduit adapted for permitting a flow of intake air from said intake circuit to said exhaust manifold.

6. The exhaust gas recirculation system of claim 1 wherein said exhaust gas recirculation cooler is a heat exchanger for transferring heat from said recirculated exhaust gas to said intake air in said intake air bypass conduit thereby cooling said recirculated exhaust gas and concurrently heating said intake air in said intake air bypass conduit.

7. The exhaust gas recirculation system of claim 1 wherein said exhaust gas recirculation conduit is disposed in fluid communication with said exhaust manifold for permitting a flow of exhaust gas from said exhaust manifold to said intake manifold.

8. The exhaust gas recirculation system of claim 1 wherein said exhaust gas recirculation conduit is disposed in fluid communication with one or more cylinders for driving a flow of exhaust gas from said cylinders to said intake manifold.

9. The exhaust gas recirculation system of claim 1 wherein said intake circuit further includes a venturi throat disposed downstream of said air intake pressurizing device, and wherein said exhaust gas recirculation conduit is disposed in fluid communication with said venturi throat for driving a flow of exhaust gas to said intake manifold via said venturi throat.

10. The exhaust gas recirculation system of claim 1 further including a particulate trap disposed in operative association with said exhaust gas recirculation conduit for cleansing said recirculating exhaust gas.

11. The exhaust gas recirculation system of claim 1 further including a valve disposed proximate said exhaust gas recirculation conduit for controlling the flow of recirculated exhaust gas.

12. The exhaust gas recirculation system of claim 1 further including a valve disposed proximate said intake air bypass conduit for controlling the flow of diverted intake air.

13. The exhaust gas recirculation system of claim 1 further including an EGR valve disposed proximate said exhaust gas recirculation conduit for controlling the flow of recirculated exhaust gas; a second valve disposed proximate said intake air bypass conduit for controlling the flow of diverted intake air; and an engine control module adapted to control said EGR valve and said second valve, in response to selected engine operating parameters.

14. An exhaust gas recirculation system in an internal combustion engine having an intake circuit, an intake manifold and an exhaust manifold, said intake circuit including an intake air pressurizing device, said exhaust gas recirculation system comprising:

an exhaust gas recirculation conduit for diverting a flow of exhaust gas to said intake manifold;

an intake air bypass conduit in fluid communication with said intake circuit for diverting a flow of intake air from said intake circuit to said exhaust manifold; and an exhaust gas recirculation recouperator disposed in operative association with said intake air bypass conduit and adapted for heating said intake air in said intake air bypass conduit;

wherein said heated intake air replaces said recirculated exhaust gas in said exhaust manifold.

15. The exhaust gas recirculation system of claim 14 wherein said exhaust gas recirculation recouperator is adapted for transferring heat from said recirculated exhaust gas to said intake air in said intake air bypass conduit thereby cooling said recirculated exhaust gas and concurrently heating said intake air in said intake air bypass conduit.

16. The exhaust gas recirculation system of claim 14 wherein said air intake pressurizing device includes a compressor and a gas driven turbine, said gas driven turbine adapted to receive exhaust gas from said exhaust manifold together with said heated intake air from said air intake bypass conduit and drive said compressor thereby pressurizing said intake air in said intake circuit.

* * * * *